United States Patent [19]

Covey

[11] Patent Number: 4,897,143

[45] Date of Patent: Jan. 30, 1990

[54] METHOD FOR CONDITIONING COMPOSITE STRUCTURES

[75] Inventor: James H. Covey, Snohomish, Wash.

[73] Assignee: The Boeing Company, Seattle, Wash.

[21] Appl. No.: 171,753

[22] Filed: Mar. 22, 1988

[51] Int. Cl.⁴ .................. B32B 31/08; B32B 31/28; H05F 3/00

[52] U.S. Cl. ................... 156/273.9; 156/92; 174/2; 244/1 A; 361/212; 361/218; 428/189; 428/922

[58] Field of Search .............. 264/22, 27; 425/174, 425/174.6; 156/273.9, 274.2, 304.1, 379.7, 92; 174/2; 219/50; 244/1 A; 361/212, 216, 217, 218; 428/189, 413, 902, 922

[56] References Cited

U.S. PATENT DOCUMENTS 2,510,727  6/1950  Sussenbach ............... 156/273.9 X
3,989,984 11/1976  Amason et al. .................. 361/212
4,673,450  6/1987  Burke ........................ 156/273.9 X
4,727,451  2/1988  Covey ........................... 361/218

FOREIGN PATENT DOCUMENTS 59-42928  3/1984  Japan ............................. 264/27

Primary Examiner—Jeffery Thurlow
Assistant Examiner—Leo B. Tentoni
Attorney, Agent, or Firm—Seed and Berry

[57] ABSTRACT

A method for conditioning a composite structure to have an increased sparking current threshold. The method calls for the treatment of the joint in a composite structure by injected currents for predetermined periods of time at a sequence of voltages which are initially less than the present sparking voltage threshold of the structure. The voltage levels can be increased during the treatment to be greater than the sparking voltage threshold of the original structure. If the composite structure contains fasteners, the sparking voltage threshold can be conveniently increased by injecting the current from a timed voltage source through a variety of pairs of the fasteners.

9 Claims, 3 Drawing Sheets

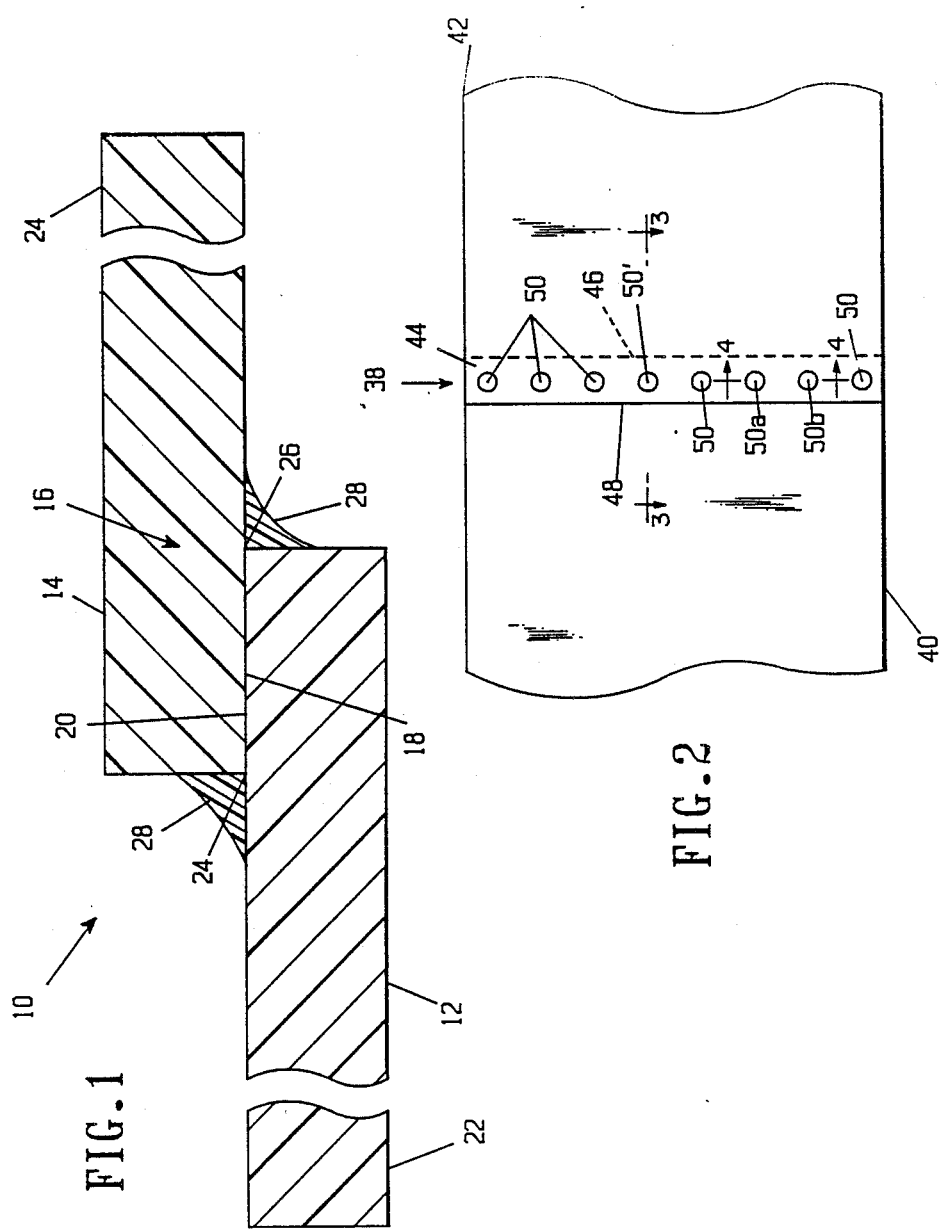

METHOD FOR CONDITIONING COMPOSITE STRUCTURES

GOVERNMENT RIGHTS

The Government has certain rights in this invention.

TECHNICAL FIELD

This invention relates to composite structures, and more particularly, to a method for conditioning composite structures and the structures conditioned by the method.

BACKGROUND ART

There is a great deal of interest in how structures made from composite materials respond to high levels of electrical currents conducted through them, particularly carbon fiber composite (CFC) structures used in aircraft. Specifically, the concern is about sparking which occurs as a result of the electrical current passing through a joint in the composite structure. This concern exists because of the ignition hazard which is present when current-caused sparking occurs in a hazardous ignitable vapor area, such as fuel tanks in airplanes, especially when the structure is held together by fasteners.

In the prior art, it has been known to safeguard potentially hazardous areas against sparking by applying a sealant material having a high dielectric constant to the joints and fasteners which would otherwise be exposed in the area. Such application, however, is expensive, time-consuming, and adds undesirable weight to the structure.

DISCLOSURE OF THE INVENTION

It is an object of the present invention to provide a method for conditioning composite material structures to increase the sparking current threshold of the structures.

It is another object of the present invention to implement the above-mentioned method in an uncomplicated manner.

It is yet another object of the present invention to provide a method for conditioning composite material structures to withstand lightning strikes without compromising the strength of the composite structure.

A still further object of the present invention is to provide conditioned composite material structures that are improved according to the method of the invention.

According to one aspect of the present invention, a composite structure having a joint between a pair of composite sheets is conditioned to increase its sparking current threshold. The sparking current threshold is increased by the step of passing a first conditioning current through the joint for a first predetermined period of time, the first conditioning current level being less than the first threshold.

In another aspect of the invention, a conditioned composite structure having an improved sparking current threshold is formed. The conditioned composite structure is made by forming at least one joint between sheets made from composite material and conditioning the joint by passing a first electrical current through the joint at a first conditioning current level for a predetermined period of time.

BRIEF DESCRIPTION OF THE DRAWINGS

FIG. 1 is cross-sectional view of an unfastened lap joint between two sheets made from composite materials.

FIG. 2 is a plan view of a composite structure, showing a single shear, fastened lap joint between two sheets made from composite materials.

BEST MODES FOR CARRYING OUT THE INVENTION

Figure 3:
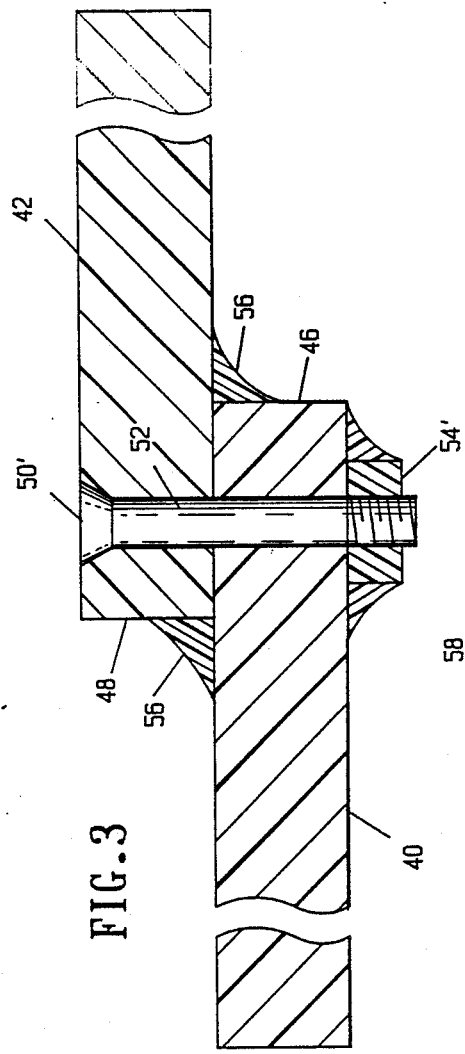
FIG. 3 is cross-sectional view of a fastened lap joint between two sheets made from composite materials, taken along line 3—3, shown in FIG. 2.

Much laboratory testing has been done in an effort to determine any changes in the sparking characteristics of joints and fastener installations in response to conducted electrical currents. One area of study has been electrical testing to determine the sparking thresholds of fasteners placed in composite graphite epoxy (GREP) structures. The technique used in the testing has been to inject an incrementally increasing sequence of electrical currents into separate lap-jointed assemblies made from the particular GREP materials until sparking occurs at the joint. This defines the sparking current threshold of the structure.

Analysis of the results of this testing has shown that the sub-threshold current injection conditions the composite material structure so that the sparking current threshold is increased by a factor of two or greater. Subjecting the structure to a series of timed injections of current can increase the sparking current threshold even more.

This increase in the sparking current threshold can be explained in terms of changes in the contact resistance between closely-fitting sheets of GREP. It has been found that the contact resistance decreases monotonically with increasing current until levels of current are reached which cause high temperature, pyrolysis, and damage to the epoxy. The changes in contact resistance are permanent, and tend to remain at the values caused by the highest current density passed across the surface.

The improvement in contact resistance is believed to be due to the elimination of epoxy particles which prevent microscopic contact between the individual carbon fibers in the GREP. In the case of structures held together by electrically conductive fasteners, the epoxy particles also prevent microscopic contact between the fastener and the carbon fibers. Contact resistance depends upon the summation of all the current paths in a joint. At a microscopic level, the sparking threshold depends on local conditions of individual fibers and their ability to convert current flow to heat. The more efficiently the current is turned into heat, the more the local regions are pyrolized and causes the epoxy to be converted to high-temperature by-products under high pressure.

Referring to the unfastened lap joint shown in FIG. 1, the composite structure 10 can be made from two or more sheets of composite material 12 and 14, such as GREP. The sheets 12 and 14 may, or may not, be made from the same composite material. The sheets overlap at a lap joint 16, where the sheets 12 and 14 are placed in close parallel proximity along their respective surfaces 18 and 20. Electrical currents, such as lightning currents, which are injected into sheet 12 at, for example, point 22 on sheet 12, can pass through the surfaces 18 and 20 in order to reach point 24 on sheet 14.

If the current through the lap joint 16 is sufficiently high, sparking will occur there. In order to prevent the sparking from reaching outside of the lap joint, present practice is to cover the exposed junctures 24 and 26 with fillets 28 of a high dielectric adhesive material.

If, on the other hand, the current across the lap joint 16 is below the sparking current threshold, no sparking is produced and the composite structure is far less susceptible to catastrophic explosions that would otherwise be caused by sparks in the joint.

An improved lap-jointed composite structure can be created from an existing composite structure by exposing the joint to one, or more, injections of current at levels that are less than the sparking current threshold. It has been found particularly advantageous to repeat a series of current injections at a particular current level for a predetermined period of time. Improvements in the sparking current threshold by a factor of two are typical: maximum improvements by a factor of four have been noted when using this method.

The structure of FIG. 1 can be subjected to the method of the invention by attaching conventional connectors to the composite sheets 12 and 14 in such a way that current flowing from one sheet to the other must pass through the lap joint 16. Only those portions of the lap joint 16 which receive the current will be subjected to the beneficial effects of the injected current. Therefore, if portions of the lap joint 16 do not receive the injected current, these areas of the composite structure will still be susceptible to sparking if they are struck by lightning or other sources of high-voltage currents which exceed the sparking current threshold of the untreated composite material. In the case of unfastened joints, it can be advantageous to treat the composite material several times by injecting the current into the structure from various points on each of the sheets 12 and 14.

FIG. 2 is a plan view of a composite structure, showing a single shear, fastened lap joint 38. The lap joint is between two sheets 40 and 42 of composite material, with sheet 40 lying over sheet 42. The common surface area 44 between the two surfaces lies between respective edges 46 and 48 of sheets 40 and 42. The lap joint is fastened together by a row of fasteners 50 which can be placed in any array which provides the desired strength properties to the lap joint 38.

The fasteners 50 can, for example, be countersunk bolts 52 which are held in place by threaded nuts 54. Any other fastener 50 appropriate to the particular application can also be used to hold the lap joint together. Portions of the lap joint 38 are shown in cross-section in FIGS. 3 and 4. FIG. 3 shows fillets 56 formed along the respective junctures of edges 46 and 48 sheets 40 and 42, as well as fillets 56 formed over the contact area between the nut 54 and the sheet 42. The fillets can partially cover one of the parts (say, the nut 54') of the fastener 50' (as shown in FIG. 3), or can cover all exposed portions of any part of the fastener 50. Alternatively, the fasteners 50 can be left uncovered by adhesive (as are fasteners 50a and 50b in FIG. 4).

Figure 4:
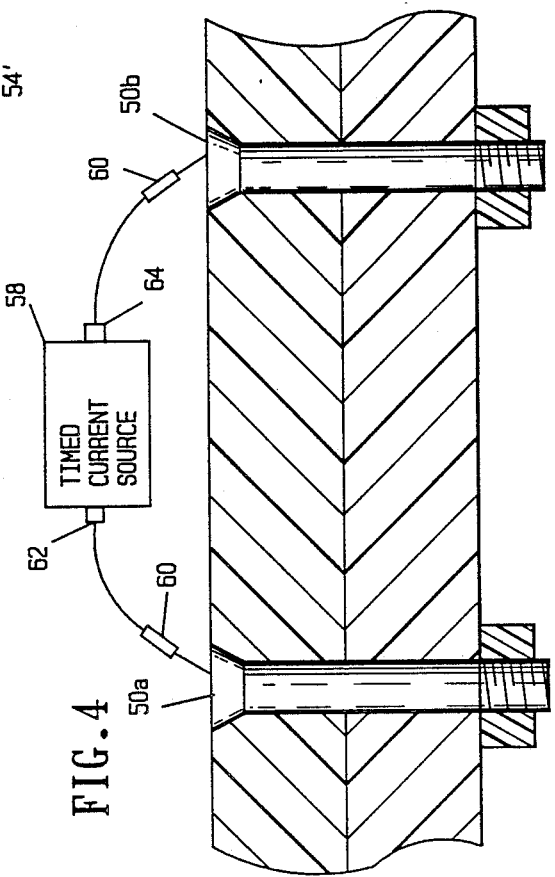
FIG. 4 is cross-sectional view of a fastened lap joint between two sheets made from composite materials, taken along line 4—4, shown in FIG. 2.
Figure 5:
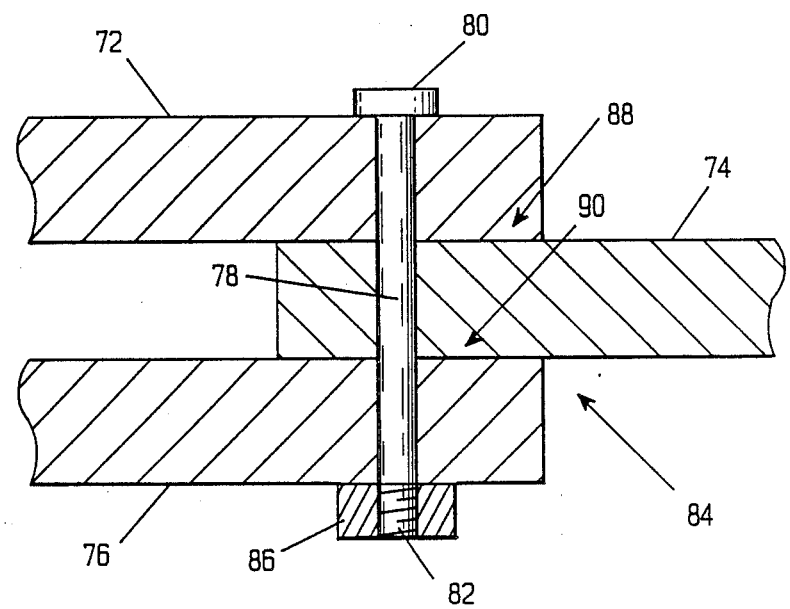
FIG. 5 is a cross-sectional view of a double shear, fastened lap joint between two sheets made from composite materials.

If desired, the composite structure shown in FIGS. 3-5 can be given an increased sparking current threshold by passing currents through the sheets 40 and 42. Preferably, however, a more uniformly treated lap joint results when currents are applied through the fasteners 50, which must be conductive for the treatment to be effective. As illustrated in FIG. 4, a timed current source 58 can be connected between a pair of fasteners 50a and 50b and a current whose level is less than the sparking current threshold of the untreated composite lap joint structure applied to the fasteners 50a and 50b and to the lap joint 38 for a predetermined period of time. Subsequent treatments of the pair of fasteners 50a and 50b can be carried out at other current levels for other predetermined periods of time. Depending upon the application and the treatment current level, the subsequent periods of time can be shorter or longer.

For rapid treatment of a structure having several fasteners 50, a pair of current probes 60 can be connected to the outputs 62 and 64 of the timed current source 58 and the probes 60 sequentially connected to pairs of fasteners 50 until the lap joint 38 has been completely treated. The treatment improves the sparking current threshold by treating the common surface area 44 of the lap joint 38. It also improves the sparking current threshold between the fasteners 50 and sheets 48, 42 by treating the interface between the fasteners 50 and the surrounding composite material in the sheets 40 and 42.

Another form of joint which can be treated by the method of the invention is shown in FIG. 5. This composite structure has a double shear bolted lap joint of composite material sheets 72, 74, and 76. A bolt fastener 8 having a head 80 and a threaded end 82 holds the lap joint 84 in compression by means of a threaded nut 86 attached to the threaded end 82. The lap joint 84 can be treated by either passing current at an appropriate sub-sparking current threshold level between sheets 72 and 76 or, to achieve more uniform results, through fasteners 78. If the lap joint 84 is treated by passing current between fasteners 78, the conductivities of the sheets 72, 74, and 76 must be approximately equal. Otherwise, the most conductive sheet will receive most of the current from the fastener 78 into which the current is being injected and will pass this current to the other fastener 78 from which the current is being received. Essentially, the other, less conductive sheets will not receive sufficient treating current. As a consequence, the lap joint 84 will not be treated adequately. Pairwise treatment of the fasteners 78, as described above, has been shown to produce more uniformly treated lap joints. This is particularly true when the current is injected into a first fastener 78 on one side of the lap joint 84 (e.g., the fastener head 80) and received at a second fastener 78 on the other side of the lap joint 84 (e.g., the threaded end 82). The method of treating the structure through the fasteners 78 is to be preferred since it treats the fasteners 78 as well as the contact surfaces 88 and 90.

A detailed illustrative embodiment of the invention has been disclosed herein. However, other composite structures having other forms of joints with abutting surfaces, such as butt joints, can be conditioned to have increased sparking current thresholds.

Therefore, while the preferred embodiments of the present invention have described in the foregoing, one skilled in the art will readily appreciate that various modifications of the invention may be made without departing from its spirit and scope. Accordingly, the spirit and the scope of the present invention are to be limited only by the following claims.

I claim:

1. A method for conditioning a composite structure by increasing a sparking current threshold of said structure from a first threshold to a second threshold, said structure including at least one joint between sheets made from composite materials, said sparking current threshold being a minimum current which causes sparking at at least one said joint, the method comprising the step of passing a first conditioning current through said joint for a first predetermined period of time, said first conditioning current level being less than said first threshold.

2. The method of claim 1, further comprising the step of passing a second conditioning current through said joint for a second predetermined period of time.

3. A method for conditioning a composite structure by increasing a sparking current threshold of said structure from a first threshold to a second threshold, said structure including at least one joint between sheets made from composite materials, said sparking current threshold being a minimum current which causes sparking at at least one said joint, the method comprising the steps of:
   (a) attaching a pair of electrical contacts to the structure;
   (b) connecting a current supply between said pair of electrical contacts; and
   (c) operating said current supply at a first conditioning current level for a predetermined period of time to cause a first electrical current to pass through said joint, said first conditioning current level being less than said first threshold.

4. The method of claim 3, further comprising the step of operating said current supply at a second conditioning current to cause a second electrical current to pass through the joint for a second predetermined period of time.

5. A method for conditioning a composite structure by increasing a sparking current threshold of said structure from a first threshold to a second threshold, said structure including at least one joint between sheets made from composite materials, said joint being secured by a plurality of fasteners passing into said composite structure, said sparking; current threshold being a minimum current which causes sparking at at least one said joint, the method comprising the steps of:
   (a) connecting a first current supply between two fasteners in a first pair of said fasteners; and
   (b) operating said first current supply at a first conditioning current level to cause a first electrical current to pass through said composite material between said first pair of fasteners for a first predetermined period of time.

6. The method of claim 5, further comprising the steps of:
   (c) connecting a second current supply between two fasteners in a second pair of said fasteners; and
   (d) operating said second current supply at said first conditioning current level to cause a second electrical current to pass between said second pair of said fasteners for a second predetermined period of time.

7. The method of claim 6, further comprising the step of:
   (e) repeating steps (c) and (d) for at least one of any remaining pairs of said fasteners.

8. The method of claim 5, further comprising the step of (c) operating said first current supply at a second conditioning current level to cause a second electrical current to pass between said first pair of fasteners for a second predetermined period of time.

9. The method of claim 8, further comprising the steps of:
   (d) connecting a second current supply between two fasteners in a second pair of said fasteners;
   (e) operating said second current supply at said first conditioning current level to cause a third electrical current to pass between said second pair of said fasteners for a third predetermined period of time; and
   (f) operating said second current supply at said second conditioning current level to cause a fourth electrical current to pass between said second pair of fasteners for a fourth predetermined period of time.

* * * * *

UNITED STATES PATENT AND TRADEMARK OFFICE
CERTIFICATE OF CORRECTION

PATENT NO. : 4,897,143

DATED : January 30, 1990

INVENTOR(S) : James H. Covey

It is certified that error appears in the above-identified patent and that said Letters Patent is hereby corrected as shown below:

In claim 5, column 6, line 1, delete "sparking; current" and substitute therefor --sparking current--.

Signed and Sealed this

Fifteenth Day of January, 1991

*Attest:*

HARRY F. MANBECK, JR.

*Attesting Officer*  *Commissioner of Patents and Trademarks*